United States Patent [19]
Franclet et al.

[11] 4,369,599
[45] Jan. 25, 1983

[54] CULTIVATION BALLS

[75] Inventors: André Franclet, Donnemarie; Pierre Favereau, Echouboulains, both of France

[73] Assignee: Association Foret-Cellulose, Paris, France

[21] Appl. No.: 234,501

[22] Filed: Feb. 17, 1981

Related U.S. Application Data

[63] Continuation of Ser. No. 5,230, Jan. 22, 1979, abandoned.

[30] Foreign Application Priority Data

Feb. 9, 1978 [FR] France ................................ 78 03708

[51] Int. Cl.³ ............................................. A01G 9/02
[52] U.S. Cl. .......................................... 47/74; 47/84; 47/77; 111/2
[58] Field of Search .................. 47/74, 77, 84, 64, 5.5; 111/2

[56] References Cited

U.S. PATENT DOCUMENTS 3,110,128 11/1963 Collins .................................... 47/5.5

FOREIGN PATENT DOCUMENTS 1165543 10/1969 United Kingdom .................... 47/74

Primary Examiner—Robert E. Bagwill
Attorney, Agent, or Firm—Brisebois & Kruger

[57] ABSTRACT

A cultivation ball is formed from at least one envelope, which is sealed or substantially sealed, containing the cultivation substrate; the plant is disposed in the ball, being separated from the substrate by at least one wall of the envelope or envelopes, and each envelope is made from a material through which the roots of the plant can pass once the ball has been set to grow. The substrate-containing envelope can be produced industrially at high rates of production, and is easily applied to the plant.

6 Claims, 13 Drawing Figures

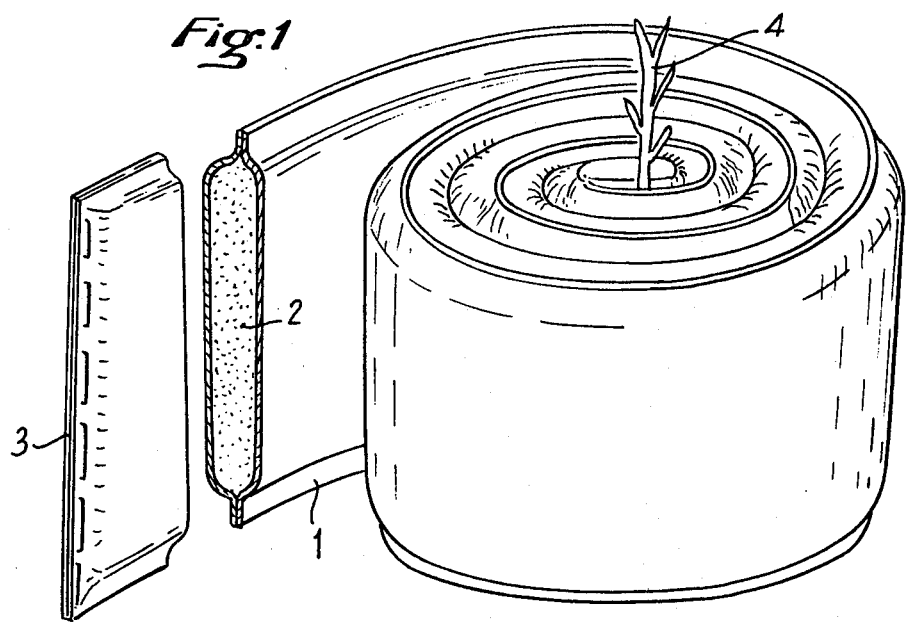
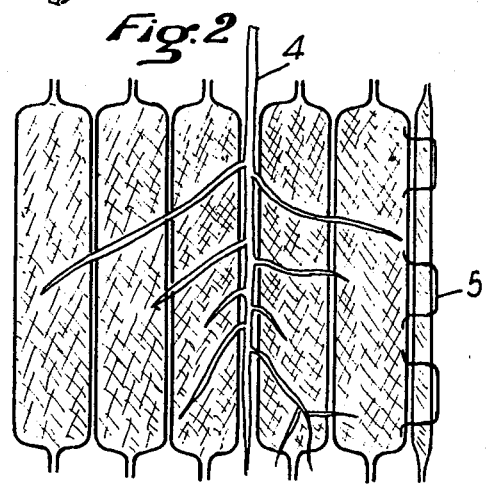
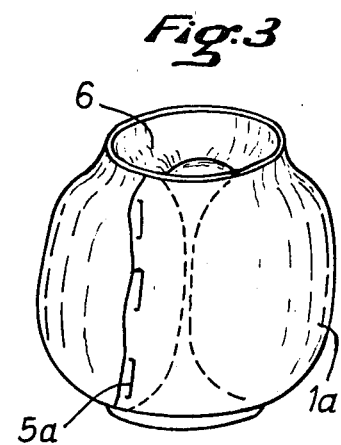
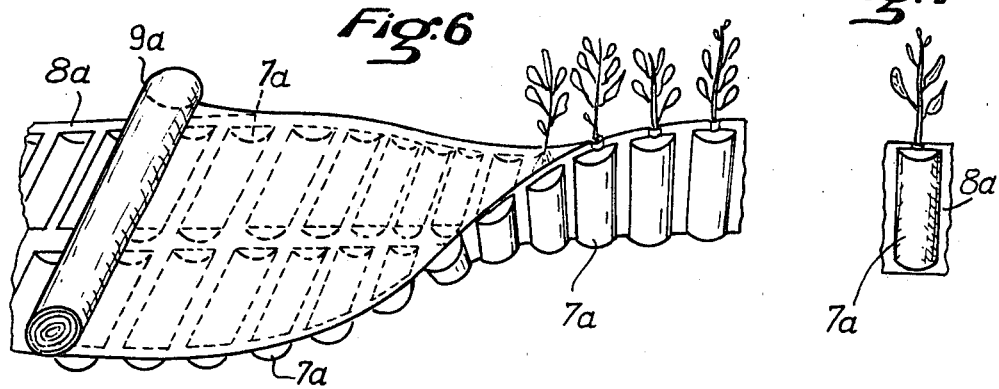

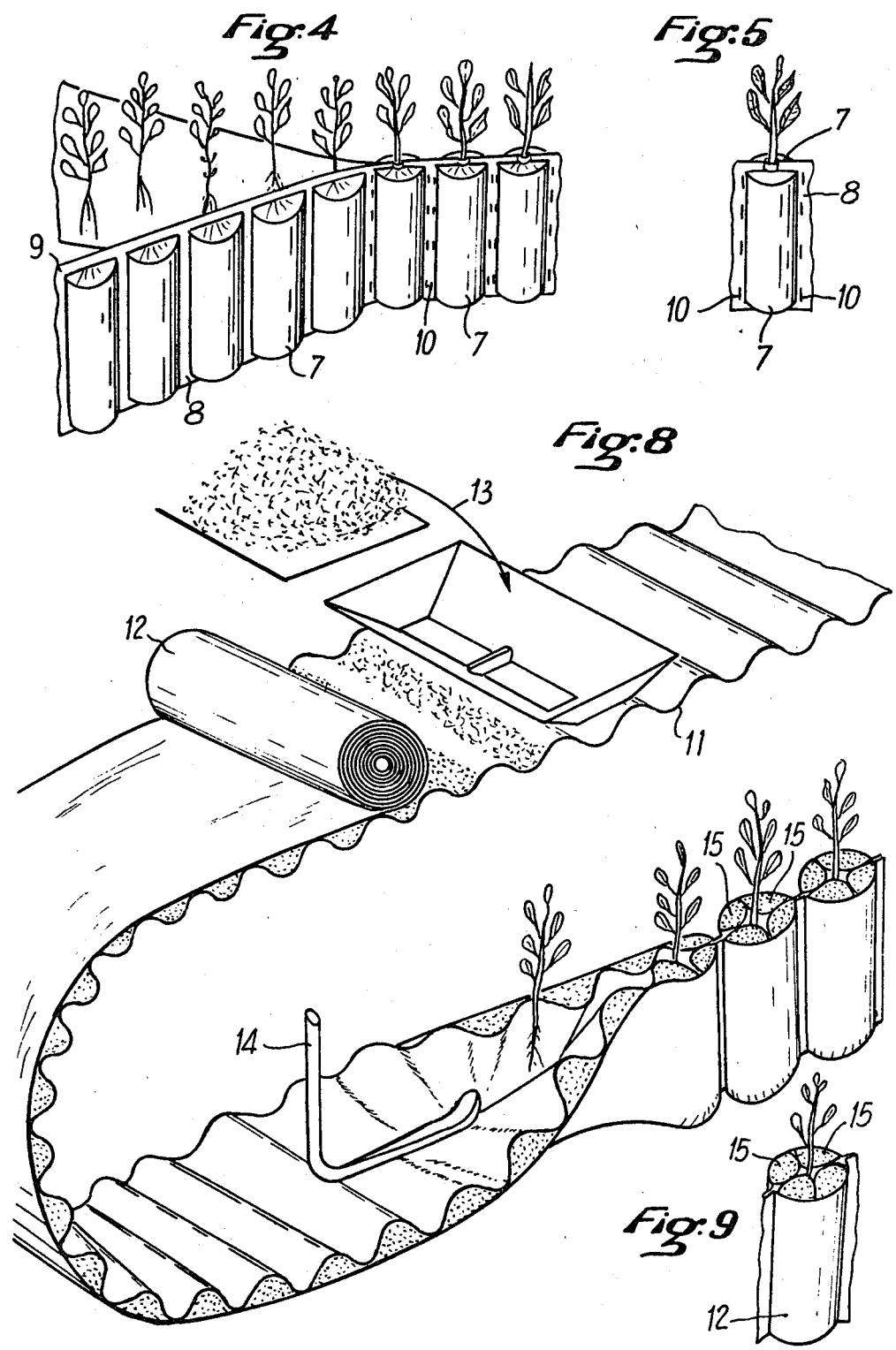

U.S. Patent   Jan. 25, 1983   Sheet 3 of 3   4,369,599
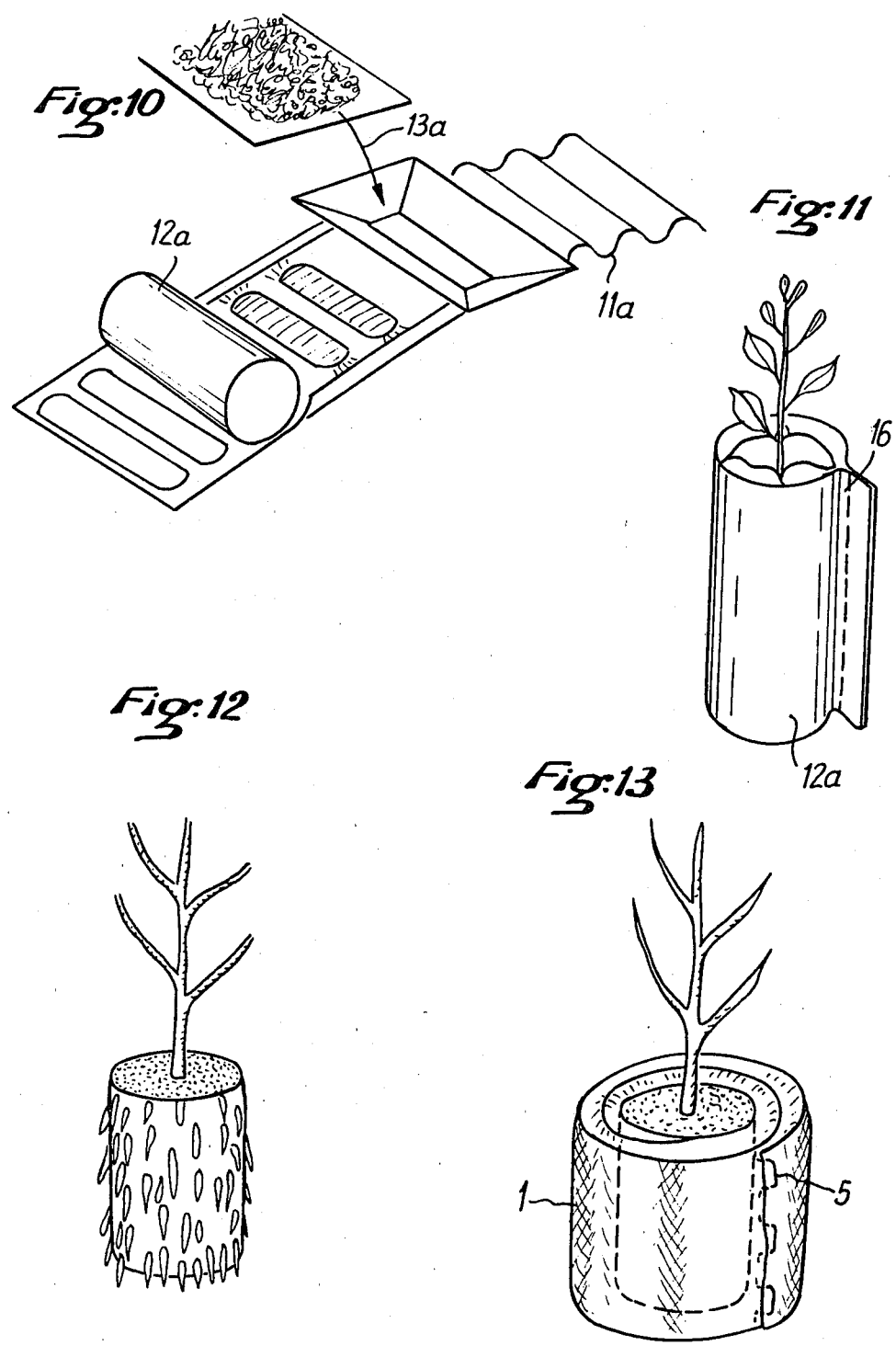

CULTIVATION BALLS

This is a continuation of application Ser. No. 005,230, filed Jan. 22, 1979 and now abandoned.

The present invention relates to cultivation balls which are intended, in particular, for use in nurseries and to be left in the ground with the plant after the final planting out.

In their French Patent application No. 76.13787 the Applicants have already described a process for making cultivation balls in which a cultivation substrate or growing medium is provided, wherein a plant or a cutting is put in place on a flexible support in the form of a strip, after which this support is folded on itself to form successive layers.

The cultivation balls made by this process are generally satisfactory when it is possible to produce them near to the nursery where they are to be used. In fact, a good cohesion is obtained in these balls when the cultivation substrate is moist. This cohesion is not ensured with dry, powdered cultivation substrates.

It is not therefore possible to pre-fabricate the balls industrially in a factory, to equip them with a dry substrate and to pack them up and send them to the various nurseries where they will be used.

Moreover, the process described in the above-mentioned French Patent application cannot be carried out at high rates of production, since each cultivation ball must be produced individually by a succession of operations involving layering, folding, particularly rolling, and fixing, particularly by means of staples.

Conversely, the present invention proposes the making of a cultivation ball which can be produced industrially at high rates of production, and can be packed and transported to the place where it is to be used without danger of losing its original shape and allowing the cultivation substrate or growing medium which it contains to escape.

The cultivation ball according to the invention is intended to hold plants, cuttings, suckers, seeds and the like, but for the sake of simplicity in the description, the term plant will be used throughout the following description.

The present invention relates to a cultivation ball as a new industrial product, comprising a cultivation substrate and a plant, characterised by the fact that it is formed from at least one envelope, which is sealed or substantially sealed, containing the cultivation substrate, that the plant is disposed in the said ball separated from the said substrate by at least one wall of the envelope or envelopes, and that the envelope or envelopes are made from a material through which the roots of the plant can pass once the ball is set to grow.

A "closed or substantially closed envelope" within the framework of the present invention means an envelope which is able to contain a cultivation substrate which is in particular powdery in the dry state, and has no opening or possibly one or more openings arranged in such a way that the cultivation ball may be packed, transported and then planted out in a position, without the substrate escaping from the envelope in which it is contained.

It is possible to use numerous types of material for making the envelope or envelopes of the cultivation ball according to the invention.

Thus, it is possible to make the walls of the envelope or envelopes from thin, flexible homogeneous sheets with a sufficiently loose structure for the roots to perforate them freely, but nonetheless sufficiently close to retain the substrate. As substances which are suitable for making such sheets, the following may be mentioned, without this list being in any way limitative: polyurethane foam natural or synthetic polymers such as, for example, papers, cellulose, cardboard, plastic foams, foam rubber, etc., as they occur or having been subjected to molecular, mechanical, physical or chemical splitting or reticulation.

It is equally possible according to the invention to make the envelopes in flexible or semi-rigid materials, in the form of sheets with a fibrous material base, either in the natural state or transformed, such as asbestos, glass wool, rock wool, synthetic or natural fibres such as, for example, wool or cotton, or metal threads, generally interlinked by the production method used for non-woven components. This production method for non-woven components prevents any possible throttling effect on the roots due to the crossing of the weft and warp threads. However, it is possible according to the invention to use woven products with whort and loose fibrous constituents which disintegrate biologically or break easily.

For making the envelopes according to the invention, it is equally possible to use thin sheets which are widely perforated or expanded to form a netting in which the mesh is obturated by flakes of a substance which is soluble in or destroyed by water. These flakes may be made from materials which are soluble in or destroyed by water such as, for example, cellulose fibres which have been flocked and joined by fusible or destructible glues (gelatine gelose, methyl cellulose, starch, or polyvinyl alcohol). A sheet of cellulose wadding or film-forming substances with or without extenders may equally well be used.

It is equally possible to use thin, rapidly disintegrating or soluble sheets reinforced by threads spread over and stuck on one or both faces of the sheet. For these threads, fibres of cotton, wool, rubber or elastomer may be used. It is equally possible to use layers of cellulose tissue, loaded or not, or sheets of a nitrated material such as gelatine.

According to a first production method, the cultivation ball comprises a single sealed envelope in the form of a flattened tube sealed at its ends, rolled up or folded over on itself, the plant being disposed substantially in the centre.

With this method, depending on the thickness of the tube which forms the envelope, the ball may be made from several layers or adjacent coils, or may be formed by a single layer. In the latter case it is possible to fill up the central hollow space subsequently before use with a cultivation substrate which is suitable for taking seeds. A ball of this kind may be used to advantage for direct sowing.

After forming the ball, it is held in position by any appropriate means such as stapling, gluing, seaming, heat-welding, or stitching, although this list is in no way limitative.

According to another method of making the ball according to the invention, the ball is produced by assembling two envelopes in the form of substantially semi-cylindrical sachets which are joined along two planar facing walls, the plant being disposed between the walls. Advantageously, the planar walls are each cut off from a continuous strip. It is thus possible to make sets of balls which are interconnected along the longitudinal edges, the connection being provided by the said strips.

In this way it is possible to pack up sets of interconnected balls, and then to cut the connecting strips to obtain the separate balls.

To make such balls or sets of balls, according to an advantageous method of putting the invention into effect two continuous strips are made, each comprising a plurality of sealed compartments of substantially semicylindrical shape, parallel and spaced out from each other, and filled with substrate, on one face of a continuous sheet of material which has the characteristics which are required according to the invention, and then, after having placed a plant between the opposing surfaces of the sheets level with each pair of compartments, the pairs of compartments are brought together, after which the cultivation balls are separated by cutting the strips between the balls thus formed.

As a variation it is possible to use a single strip comprising two rolls of cells, the strip being folded along its longitudinal axis.

According to another method, the ball according to the invention comprises a plurality of envelopes in the form of sachets, particularly with a substantially cylindrical shape, distributed of a section of strip, the ends of which are joined together, the plant being disposed in the centre. The strip may be made as in the preceding example, and then cut off in sections, each section being folded over so as to join up the ends.

In the two preceding methods, the compartments forming the sachets filled with substrate may be made by putting together two sheets, one of which is flat and the other of which is corrugated and contains the substrate in its channels.

According to another method, the cultivation ball according to the invention is formed by assembling four tubular envelopes together, sealed at least on one of their edges, having a substantially semi-circular section, and, when in contact, defining between them a hole through the centre of the ball, to hold the plant.

A cultivation ball of this kind may be made advantageously by using a corrugated sheet, in each of the grooves of which some cultivation substrate is inserted, the corrugated sheet filled with substrate then being covered by a sheet of the same material or of material with similar properties; these sheets, after the whole has been folded along a longitudinal axis, define sets of balls each formed by four tubular envelopes, originating two by two from a groove filled with substrate.

It will be realised that, within the scope of the present invention, cultivation balls have thus been made which can be produced industrially at high production rates, are capable of being grouped together for packing and transportation and in which the roots or the plants are never in direct contact during production, packing or transport with the substrate which is enclosed in the envelope or envelopes, the roots being obliged of necessity to pass through at least one wall of the envelope or envelopes after the ball has been set to grow, in order to arrive at the cultivation substrate.

According to the invention, numerous types of substrate may be used, especially with a base of a mixture of natural soils, peats, crushed bark, lignite ash, sawdust, porous mineral or organic substances enriched according to circumstances with fertilizers and additives, mycorrhiza, etc.

Other advantages and characteristics of the invention will become apparent from reading the following description, given by way of example and in no way limitative, of several methods of making balls according to the invention, with reference to the attached drawing.

FIG. 1 is a view showing a first method of making a cultivation ball according to the invention, during its manufacture, with a part detached.

FIG. 2 is a section through the ball shown in FIG. 1, during growth.

FIG. 3 shows a different way of making the ball shown in FIG. 1.

FIG. 4 shows schematically the production of a ball by another method.

FIG. 5 shows a ball made as shown in FIG. 4.

FIG. 6 shows schematically the production of a ball by another method.

FIG. 7 shows a ball made by the method shown in FIG. 6.

FIG. 8 shows schematically the production of a ball by another method.

FIG. 9 shows a ball made by the method shown in FIG. 8.

FIG. 10 shows schematically the production of a ball by another method.

FIG. 11 shows a ball obtained by the method shown in FIG. 10.

FIG. 12 shows a ball according to the invention at the end of cultivation in the nursery.

FIG. 13 shows a ball according to the invention, made using the ball shown in FIG. 12.

Reference will be made first to FIGS. 1 and 2.

These show a ball made according to a first method of the present invention.

The ball is formed by an envelope 1 which is in the form of a flattened tube, cut to the desired dimensions for the ball, filled with a cultivation substrate or growing medium 2 and preferably sealed at each of its ends 3 by any suitable fixing means such as by a seam or by staples, for example.

The envelope 1 may be formed by a continuous tubular component, extruded or produced continuously according to any appropriate method depending on the material used, or, as in the illustration in FIG. 1, it may be made by assembling two sheets along their longitudinal edges.

To make the ball according to the invention, the flattened tube which forms the envelope is folded over or rolled up on itself after a plant 4 or the like has been arranged in the centre. To hold the ball in position it is then only necessary to fix the end of the tube forming the envelope 1 onto the adjacent inner coil by any appropriate means, notably by staples as shown in FIG. 2 at 5.

In this method the tube is made from two thin sheets of polyurethane foam joined together and glued along their longitudinal edges, the ends 3 being joined by seaming.

When the ball is held in position with staples, it is advantageous for these to be made in alloys containing elements such as copper, cobalt, molybdenum, zinc, etc., in order to release trace elements which are useful in the subsequent development of the plant.

In the different method shown in FIG. 3, the ball is made by folding a tube 1a with the same structure as the tube 1 in FIG. 1, but thicker, so that the ball comprises a single layer of substrate. After having folded the tube 1a over on itself, it is necessary only to fix the ends, particularly by stapling as shown in FIG. 5a. The central hollow space 6 may also be filled subsequently with cultivation substrate, if desired, and may have seeds put in it.

FIGS. 4 and 5 show the production of a different ball according to the invention.

The ball shown in FIG. 5 is composed of two envelopes 7, each in the form of a closed sachet with a substantially semi-cylindrical shape, joined together along their planar faces via sections of sheeting 8. To make a ball of this type, a number of compartments which are filled with cultivation substrate are made in a sheet of material with suitable properties and structure for the present invention, after which the sheet 8 equipped with compartments filled with substrate is covered with a flat sheet 9. The compartments thus formed constitute the sachets 7. To make balls according to the invention, two strips thus formed are used, being laid one on the other as shown in FIG. 4, and a plant is inserted between the opposing pairs of sachets 7. The strips are then fixed together between the pairs of sachets by lines of staples, glue or the like 10 along the boundaries of the ball formed. In this way, as shown in FIG. 4, a row of balls is obtained, connected together by sections of strip, and it is necessary only to cut this to obtain each separate ball as shown in FIG. 5. It will be appreciated that the balls may be packed and transported attached to each other, and cut at the location whereby they are to be used.

The method shown in FIGS. 6 and 7 differs from that shown in 4 and 5 by the fact that the strip 8a which is used comprises two compartments 7a across its width, arranged symmetrically along its longitudinal axis. Thus, to make the balls according to the invention, a single strip is used, constituted by the sheet 8a and a covering sheet 9a, assembly being effected after folding the strip thus formed around its longitudinal axis. The assembly of the two halves of the strip is effected by stapling, gluing or the like as in the example shown in FIGS. 4 and 5. In this case as well, therefore, series of balls attached to each other are obtained, and may easily be separated subsequently at the location where they are to be used.

In the method shown in FIGS. 8 and 9 a lower corrugated sheet 11 is used, being covered by a flat sheet 12 after some cultivation substrate has been placed in the grooves with the aid of a tool in the form of a funnel as shown schematically at 13. To produce balls according to the invention it is necessary only to fold the strip formed by the two sheets 11 and 12 around its longitudinal axis with the aid of a pressing tool shown at 14, so as to make balls constituted by four compartmented tubular envelopes 15 which define between them a central hole for holding a plant, the envelopes being produced two by two from one channel in the strip formed by the sheets 11 and 12 and folded around its longitudinal axis.

To form sets of balls it is necessary only to join the strips together, particularly by stapling, along the boundaries of the balls formed by the methods as shown in FIGS. 4 to 7. In the example shown, the tubular envelopes 15 are open at one of their ends. However, it is possible to make sealed envelopes by joining the sheets 11 and 12 together along their longitudinal edges after filling with substrate.

In the method shown in FIG. 10, a corrugated sheet 11a is used, in the grooves of which cultivation substrate is disposed so as to define compartments filled with substrate and covered with a sheet 12a, the substrate having been introduced with the aid of a funnel as shown schematically at 13a. In this way a strip is made which has compartments as in the example shown in FIGS. 4 and 5. Naturally, it is possible to assemble this strip together with a similar strip to make an assembly such as that shown in FIGS. 4 and 5. However, in a different method, the strip formed by assembling the sheets 11a and 12a together is cut to the desired length so that, by folding as shown in FIG. 11, a cultivation ball is obtained, the ends of the section of cut strip being joined together along a line, particularly with staples 16. The ball thus formed comprises a number of sealed envelopes defined by compartments formed by the channels in the sheet 11a. As shown in FIG. 10, the longitudinal edges of the sheets 11a and 12a are joined together in such a way as to define sealed compartments.

FIG. 12 shows a ball according to the invention at the end of cultivation in the nursery. The external wall of the ball is covered with roots. To prolong the stay of such a cultivation ball in the nursery and to offer the plant a supplementary volume of substate, a ball such as that shown in FIG. 13 is made, using the construction of the ball shown in FIG. 1 or in FIG. 3, by rolling a tube 1 containing cultivation substrate around the exhausted ball, the tube being held in place, particularly by stapling. Naturally, it is equally possible to replace the tube 1 by a section of strip such as that made, for example, according to FIG. 10, this section of strip being rolled round the exhausted ball.

It is equally possible according to the invention to roll a tube filled with substrate as shown in FIGS. 1 and 3 or a section of strip as shown in FIG. 10 around the ringed or tied-off part of a stem to produce an aerial runner.

Although the invention has been described with reference to particular methods of production, obviously it is in no way limited thereby, and various modifications may be made to it, notably in the shapes and materials used, without thereby exceeding either its scope or its spirit. In particular, although the balls have been shown with a generally substantially cylindrical shape, it is possible to give them any suitable shape, notably a truncated cone shape.

We claim:

1. A plant cultivation ball comprising at least one envelope in the form of a flattened elongated tube having an inner wall and an outer wall, a powdery cultivation substrate within the tube, means closing each end of the tube to prevent escape of the cultivation substrate from the tube, said tube being wound around the plant and around itself to form a ball of at least one convolution within which the plant is separated from said substrate by at least one wall of said envelope, said inner wall of said tube comprising a first sheet, and said outer wall of said tube comprising a second sheet, said sheets being joined together along their longitudinal edges, said sheets forming said walls of said envelope each comprising a material through which the roots of the plant can pass once the ball has been set to grow and said tube being devoid of any attached root impermeable covering so that the roots of a plant within the ball can pass freely through the ball into the medium in which the plant is set to grow.

2. A cultivation ball according to claim 1 wherein said envelope is held in position by fixing means securing an outer end of the tube to an adjacent outer surface of the tube.

3. A cultivation ball according to claim 1, wherein the tube comprises a continuous tube with a plurality of closed compartments containing cultivation substrate.

4. A cultivation ball according to claim 1, wherein said tube is rolled around a ball which has already been cultivated in the nursery.

5. A process of forming a cultivation ball comprising the steps of making a flattened tube of great length by joining along their longitudinal edges, two sheets of material through which plant roots can pass, said tube is cut into sections and is filled with a dry powdery cultivation substrate, each end of a section is closed, and the resultant closed element filled with substrate is then wound up about itself with at least one convolution around a plant disposed in the center to form a cultivation ball through and beyond which the plant roots can grow and pass, and is fastened to the envelope at the free end of the woundup element.

6. Process according to claim 5, in which the flattened tube is formed from a material selected from among the group consisting of asbestos, glass wool, rock wool, and synthetic or natural fibers.

* * * * *